United States Patent
Myer et al.

[15] 3,686,416
[45] Aug. 22, 1972

[54] METHOD AND PREPARATION FOR CONTROLLING FEEDLOT BLOAT IN RUMINANTS

[72] Inventors: RoNel M. Myer, St. George; Erle E. Bartley, Manhattan, both of Kans.

[73] Assignee: Kansas State University Research Foundation, Manhattan, Kans.

[22] Filed: July 17, 1970

[21] Appl. No.: 55,863

[52] U.S. Cl..................................................424/329
[51] Int. Cl. ..............................................A61k 27/00
[58] Field of Search.......................................424/329

[56] References Cited

OTHER PUBLICATIONS

Johns–Vet. Reviews– April 1958 Vol. 4 (pages 27 & 28)

*Primary Examiner*—Sam Rosen
*Attorney*—Dawson, Tilton, Fallon and Lungmus

[57] ABSTRACT

Feedlot bloat (as distinguished from pasture or legume bloat) is controlled while the ruminants are being fed a high concentrate feedlot bloat-inducing ration by the oral administration of a ruminant-edible water-soluble salt of a dimethyl dialkyl quaternary ammonium compound wherein the alkyl groups contain from 12 to 22 carbons. In a preferred mode of practicing the invention, from 75–100 percent of the alkyl groups are saturated and contain from 16 to 18 carbons. The anion of the quaternary compound must be of the type forming a water-soluble salt with the quaternary cation.

11 Claims, No Drawings

METHOD AND PREPARATION FOR CONTROLLING FEEDLOT BLOAT IN RUMINANTS

BACKGROUND AND SUMMARY

Microbial digestion in the forestomachs (ruminoreticulum) of ruminants provides nutrients for the host which are unavailable to animals with simple stomachs ingesting the same food. However, the fermentation process also results in the production of carbon dioxide and methane. These gases cannot be used by the host and must be eliminated. This is usually done by eructation. If eructation does not occur, or if the cardia or esophagus is blocked so that fermentation gases cannot be freely passed, distension of the ruminoreticulum will result from the increase in gas pressure. This condition is called gastric tympany, or more commonly, bloat.

Bloat is somewhat unpredictable. Some ruminants bloat more rapidly and frequently than others. The severity of bloat can vary from day to day. Ruminants maintained on a constant ration, under careful management, may not bloat for several weeks. Then, a small change in feeding regimens or weather may induce severe bloat. The highest incidence of bloat is associated with lush legume pastures during the spring and fall. This type of bloat is referred to as "pasture bloat" or "legnme uloix."

Bloat also commonly occurs in ruminants fed high quality alfalfa hay with some grain or high-concentrate, low-roughage rations. This type of bloat is usually called "feedlot bloat", as distinguished from pasture bloat. Because of the abundance of grain in the United States, more cattle are being fed large amounts of concentrates. This is especially true for fattening cattle in feedlots and for high producing dairy cows which need high energy feeds to maintain maximum milk production.

Although cattle which blot on high concentrate, low-roughage rations may not die, losses due to reduced weight gain or milk production can be substantial. Moreover, studies to promote more efficient feed utilization are hindered by the incidence of bloat. This represents an inestimable loss and can be a serious deterrent to the advancement of ruminant nutrition.

The prevention of bloat has been the object of many studies. The most effective drug yet developed for the control of bloat occurring in ruminants fed succulent legumes was disclosed in 1965. Bartley et al., *J. Dairy Sci.* 48:1657 (1965). This compound has been given the generic name of poloxalene and has been approved by the Food and Drug Administration for marketing as a legume bloat preventative. Its use in controlling pasture bloat is covered by Bartley et al. U.S. Pat. No. 3,465,083. However, poloxalene was found to be an inadequate bloat preventative for "feedlot bloat" where cattle are fed high concentrate, low legume rations. Bartley and Meyer, *J. Animal Sci.* 26:913 (1967). Despite intensive research efforts of longer duration, no satisfactory remedy has been found for feedlot bloat.

The present invention, therefore, is concerned with the control and prevention of "feedlot bloat" which results from froth formation in the rumen of animals being fed high-concentrate, low-roughage rations. Such rations are typical of those used in feedlots for the fattening of cattle. Feedlot bloat is distinctly different from legume or pasture bloat in that a long feeding period of the predominantly concentrated ration is necessary before bloat is observed. Legume bloat may well occur the first day ruminants consume bloat provocative legumes.

Feedlot bloat is an extremely complex problem. The high-concentrate low-roughage rations used for feedlot fattening are designed to produce the maximum rate of weight gain, the objective being to fatten and finish the cattle for market in a minimum time, and with a minimum amount of feed. Therefore, the problem cannot be adequately solved by employing agents which control bloat at the expense of interferring with normal rumen function. When this occurs, the animals will reduce feed intake, or go off feed entirely, thereby reducing the rate of weight gain and lengthening the feeding period to desired market weight. For dairy cattle, the reduction of feed intake can impair milk production.

Many compounds with surface active properties that beneficially affect the degree or character of the froth produced in the rumen, also have bacteriostatic properties which interfere with normal rumen function. The experimental work leading to the present invention explored the in vitro relation of microbial activity to froth production and also viscosity and surface tension effects on the rumen fluid. No pattern or significant correlations were found. Consequently, it is clear that laboratory in vitro tests provide no basis for predicting the effectiveness of preparations for controlling feedlot bloat.

It might be assumed that drugs which have been found to be of value in controlling or treating pasture bloat would also be effective for feedlot bloat. However, the correlation is very limited. For example, poloxalene, although it is the most effective known compounds for treating pasture bloat, has very limited value for controlling feedlot bloat. Very little if any reduction in the severity of the bloat can be obtained by orally administering poloxalene to feedlot bloat-induced cattle, even though the same or greater dosages are used than for cattle subject to pasture bloat.

The water-insoluble compounds obtained by reacting stearic acid with trimethyl octadecyl or hexadecyl quaternary ammonium cations have been proposed for control of feedlot bloat. In comparative tests, however, such preparations have been found to be ineffective, the severity of bloat in cattle being reduced very slightly if at all by the manufacturer's recommended dosages.

It was therefore surprising to discover that water soluble salts of dimethyl dialkyl quaternary compounds wherein the alkyl groups contained from 12 to 22 carbons can be successfully employed to control feedlot bloat. Because of the known bacteriostatic action of water-soluble quaternary ammonium compounds, it was further surprising to discover that these quaternary compounds could be fed in bloat-controlling effective amounts without appreciable adverse effect on rumen function. Consequently, by means of the present invention, bloat can be controlled while the animals continue on feed, eating a normal amount, and resulting in a normal rate of weight gain or normal milk production.

The details relating to preferred modes of practicing the present invention will now be set forth.

DETAILED DESCRIPTION

The method and preparations of this invention are characterized by the use of a water-soluble salt of a dimethyl dialkyl quaternary ammonium compound when the alkyl groups contained from 12–22 carbons. The presence of two long chain saturated or unsaturated alkyl groups has been found to be essential. As used herein the term "alkyl" refers particularly to the aliphatic hydrocarbon groups which are derived from natural fats and oils. Such hydrocarbon groups contain primarily unsaturated linkages, but may contain from one to four unsaturated linkages, and therefore are sometimes also referred to as alkylene groups. As used herein the term "alkyl" therefore refers to both saturated alkyl and unsaturated alkylene groups which contain from 12 to 22 carbon atoms. Animal fats and oils other than fish oil and vegetable oils other than coconut oil are sources of mixed alkyl groups where the alkyl groups contain predominantly from 16 to 18 carbon atoms. Where unsaturated linkages are present, they can be converted to saturated linkages by hydrogenation. For example, alkyl groups derived from animal fats, such as tallow are composed predominantly of saturated $C_{16}$ and $C_{18}$ alkyl groups. More specifically, these are hexadecyl and octacecyl aliphatic hydrocarbon groups, as derived respectively from palmitic and stearic acids. Where unsaturatic $C_{16}$ or $C_{18}$ groups are present, such as those derived from oleic or linoleic acids, they can be completely or partially converted to the saturated hexadecyl or octadecyl groups. In a preferred embodiment of the present invention, the two long chain alkyl groups of the quaternary ammonium compound are provided by alkyl groups which are either all saturated hexadecyl or octadecyl groups, or which are provided by mixtures of alkyl groups wherein at least from 75 to 100 percent by weight of the alkyl groups are saturated $C_{16}$ or $C_{18}$ groups, that is, saturated hexadecyl or octadecyl groups.

The quaternary compounds useful in practicing the present invention can be represented by the formula

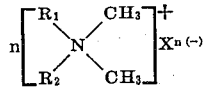

wherein $R_1$ and $R_2$ are aliphatic hydrocarbon groups containing from 12 to 22 carbons, X is an anion forming a ruminant-edible water-soluble salt with the quaternary cation, and $n$ is an integer from 1 to 2. The particular anion is not critical except that anions should be avoided which are toxic or which would tend to make the compounds inedible by ruminants. Fur-there, the anion should be selected so that the compounds are classifiable as "water-soluble". As is well recognized in the chemical arts, quaternary compounds can be water soluble although microscopic examination may indicate that a true solution has not been formed, the quaternary compound being contained in the water as a fine colloidal dispersion. As used herein, the term "water-soluble" is intended to refer to quaternary compounds which readily form such colloidal dispersions, but it does not include salts of quaternary compounds which are neither water-soluble nor water-dispersible, such as those which are formed by the reaction of the cationic fragment of a quaternary ammonium compound with an anionic fragment of an anionic surfactant. Specifically excluded are salts of quaternary ammonium compounds with higher fatty acids. Commercially, quaternary ammonium compounds are commonly supplied as chloride, sulfate, or acetate salts, and all of these salts are readily usable, being ruminant-edible and water soluble.

Bloat control by a water-soluble salt of a dimethyl dialkyl quaternary ammonium compound can be enhanced by combining the quaternary with nonionic surfactants or liquid oils. It is believed that nonionics may provide the proper wetting action that results in the collapse of the unstable froth. Liquid oils have surfactant properties, but their function may be more that of a carrier to aid in the dispersion of the quaternary ammonium compound.

Specificity of nonionics and liquid oil used with the quaternary ammonium compound is not critical. However, nonionics and liquid oils inhibiting rumen fermentation would be unsuitable. Also, the effectiveness of some biodegradable nonionics and liquid oils would be destroyed by normal rumen microbial metabolism. Suitable synergists would include members of the polyalkylene oxide block copolymer family and their derivatives and paraffinic hydrocarbons.

In practicing the present invention, the water-soluble dialkyl quaternary is orally administered to the ruminant. The method and preparations of the invention can be used with both cattle and sheep. Probably the most important use is for beef cattle being raised for meat production, but the invention is also of value for diary cattle where they are being fed a high concentrate ration. The method and preparations can advantageously be employed while the cattle and sheep are being fed in lots, as distinguished from the range grazing of cattle or sheep. In feedlot finishing or fattening, the animals typically receive a high-concentrate low-roughage ration. Similar rations may also be fed to dairy cattle. Such rations may be formulated from vegetable proteins and grains. The rations will be low in legumes, especially in freshly cut legumes. Generically, such rations can be described as high-concentrate feedlot bloat-inducing rations.

The minimum effective doses of the water-soluble dialkyl quaternaries will vary with the species and size of the animal, the diet of the animal, and other factors. However, more than the minimum effective dose can be administered without harmful effect, and therefore an adequate effective dose can be selected on a more or less standardized basis. For example, the daily (24 hours) doses for cattle can be selected from the following table:

Table I

| Daily Dosage | Body Weight |
|---|---|
| .5 grams | under 500 lbs. |
| 10–20 grams | 500–1,000 lbs. |
| 20–30 grams | 1,000–1,500 lbs. |
| 30–40 grams | over 1,500 lbs. |

Where more exact dosage control for cattle or sheep is desirable, the effective amount of the quaternary compound administered within the range from 0.5 to 4 grams of the water-soluble dialkyl salt per 100 lbs. body weight per 24 hours. Usually, the optimum dosage for sheep or cattle will range from 1 to 3 grams of the quaternary compound per 100 lbs. body weight per 24 hours.

To enhance the bloat control afforded by the quaternary ammonium compound, nonionics or liquid oils can be included in the dosage. The relative proportion of compounds administered can vary from a dosage of dimethyl dialkyl ammonium salt with little or no nonionic or oil to a mixture of 1 part quaternary with 4 parts nonionic or liquid oil. It would not be necessary at any time to exceed a combined dosage of 10 grams of the mixture of compounds per 100 lbs. body weight of cattle or sheep. Ordinarily, 5 to 6 grams of the mixture per 100 lbs. body weight will be sufficient to prevent feedlot bloat.

It should be understood that the oral administration at the levels indicated above will ordinarily be continued for several weeks or months, the administration extending over substantially the entire feedlot fattening of the cattle or sheep, or during the time dairy cattle are fed high-concentrate low-roughage rations. During the first few days or weeks in the feed-lot, the high-concentrate ration may produce little or no signs of feedlot bloat. Consequently, it may not be essential for the administration of the quaternary compound to commence the first day or even during the first week of feedlot fattening. However, at least when the first signs of feedlot bloat begin to be observable, the administration of the quaternary compound should be started. As a conservative preventive practice, the quaternary compound may be fed concurrently with the high-concentrate ration substantially from the beginning of feedlot fattening or lactation period and continued substantially to the end of the fattening or lactation period. Since there is some carryover effect from the administration, it is possible to discontinue the oral administration for a few days during feedlot fattening, or at the end of the fattening period, while still avoiding severe bloat. In general, however, the quaternary compound will be administered during the fattening regime and will be continued for an extended period of time, such as 30 to 60, 90 or 120 days.

Since feedlot cattle or sheep commonly receive protein and mineral supplements, the quaternary compound can be conveniently administered in admixture with the supplemental feed. Protein supplements can be prepared from oil-extracted vegetable meals, such as soybean and cottonseed meal, or from high protein legumes such as dehydrated alfalfa meal or from by-products such as tankage, dried blood, etc., or from urea or other non-protein nitrogen compounds. Mineral supplements are generally prepared from salt, but may also include calcium and/or phosphorus compounds and trace minerals. Liquid or dry molasses can be included with the protein and/or mineral supplement. The amount of the supplement received per day by each animal is ordinarily known with considerable certainty, and therefore the dose level can be regulated by incorporating the quaternary at a particular concentration in the supplement. Where a high grain ration is being used, the quaternary compound can be mixed with the grain, or with the complete ration. Still another usable procedure is to apply the quaternary compound, preferably in admixture with an edible carrier or diluent as a top dressing for the daily ration of feed material. These and similar techniques are well-known in the art of administering drugs to ruminants, and need not be further discussed herein. In general, preparations of this invention for controlling feedlot bloat will comprise a ruminant-edible carrier having dispersed therein a feedlot bloat-controlling effective concentration of the ruminant-edible, water-soluble salt of the dimethyl dialkyl quaternary. The character of the ruminant edible material or ruminant feed material can be varied, as indicated above, and also depending upon whether the ration is intended for cattle or sheep. The quaternary can be admixed with typical cattle feed material, including protein or mineral supplements or the complete ration, as already described.

The experimental basis of the present invention, as well as preferred modes of practicing it are illustrated by the following Examples.

EXAMPLE I

In this experiment in vitro froth production, surface tension, relative viscosity, and microbial activity (defined by gas production) were used to compare nonionics, mineral oil, trimethyl alkyl quaternaries, and dimethyl alkyl quaternaries. Each drug was tested at two dosage levels. The details of the methods for relative viscosity, surface tension, in vitro froth production and microbial activity measurements are set out below together with the techniques used to obtain the rumen samples. For comparative purposes data were expressed as a relative value of the untreated sample. The results are set out below in Table A.

TABLE A

| Drugs[a] | Dosage (mg/50 ml) | Froth Production | Microbial activity Relative | Surface Tension values (b) | Relative viscosity |
|---|---|---|---|---|---|
| Poloxalene | 20 | 0.72 | 0.92 | 0.73 | 0.99 |
| " | 60 | 0.78 | 1.00 | 0.71 | 1.01 |
| Tetronic 1501 | 20 | 0.36 | 0.87 | 0.69 | 0.98 |
| " | 60 | 0.39 | 0.91 | 0.62 | 1.01 |
| Pluradot HA520 | 20 | 0.27 | 1.12 | 0.73 | 1.01 |
| " | 60 | 0.64 | 1.08 | 0.68 | 1.04 |
| Mineral Oil | 20 | 0.98 | 0.89 | 0.92 | 0.98 |
| " | 60 | 0.89 | 1.07 | 0.91 | 1.00 |
| Arquad 12/50 | 20 | 0.80 | 0.64 | 0.80 | 1.01 |
| " | 60 | 0.55 | 0.16 | 0.69 | 1.04 |
| Arquad 16/50 | 20 | 0.66 | 0.70 | 0.90 | 1.01 |
| " | 60 | 0.85 | 0.16 | 0.76 | 1.04 |
| Arquad 18/50 | 20 | 0.97 | 0.66 | 0.89 | 1.01 |
| " | 60 | 1.07 | 0.24 | 0.86 | 0.99 |
| Arquad T/50 | 20 | 0.70 | 0.85 | 0.88 | 1.03 |
| " | 60 | 0.72 | 0.16 | 0.78 | 1.07 |
| Arquad S/50 | 20 | 0.79 | 0.60 | 0.85 | 1.02 |
| " | 60 | 0.78 | 0.16 | 0.75 | 1.05 |
| Arquad C/50 | 20 | 0.52 | 0.59 | 0.81 | 1.04 |
| " | 60 | 0.49 | 0.16 | 0.72 | 1.09 |
| Arquad 2HT/75 | 20 | 1.50 | 1.03 | 0.95 | 0.97 |
| " | 60 | 1.75 | 0.78 | 1.01 | 0.91 |
| Arquad 2S/75 | 20 | 1.10 | 0.72 | 0.90 | 0.94 |
| " | 60 | 1.69 | 0.66 | 0.86 | 0.87 |
| Arquad 2C/75 | 20 | 0.63 | 0.70 | 0.93 | 1.01 |
| " | 60 | 0.77 | 0.31 | 0.71 | 0.96 |

[a] See identification and source list below.
[b] Relative value = measurement for treated sample measurement for sample not treated Identification & Source List Supplier's
Identification    Chemical Identification    Supplier

| | | |
|---|---|---|
| Arquad 18/50 | trimethyl octadecyl-ammonium chloride (50% active) | Armour % Co. Chicago, Ill. |
| Arquad C/50 | trimethyl cocodecyl-ammonium chloride (50% active) | " |
| Arquad 12/50 | trimethyl dodecylammonium chloride (50% active) | " |
| Arquad 16/50 | trimethyl hexadecyl-ammonium chloride (50% active) | " |
| Arquad T/50 | trimethyl tallow ammonium chloride (50% active) | " |
| Arquad S/50 | trimethyl soya ammonium chloride (50% active) | " |
| Arquad 2HT/75 | dimethyl hydrogenated ditallow ammonium chloride (50% active) | " |
| Arquad 2S/75 | dimethyl disoya ammonium chloride (75% active) | " |
| Arquad 2C/75 | dimethyl dicocoammonium chloride (75% active) | Armour & Co. Chicago, Ill. |
| Adogen 442 | " | Archer-Daniels Midland Co. Mpls. |
| Poloxalene | polyoxypropylene poloxyethylene block polymer, (M.W. approx. 3000; aprox. 33% polyoxyethylene side chains) | Smith, Kline & French Labs., Philadelphia, Penna. |
| Mineral oil | viscosity 80/90 a 100°F. | Penna. Refin. Co., Butler, Pa. |
| Pluradot HA 520 | nonionic, liquid polyether based on alkoxylated triols | Wyandotte Chem. Corp. Wyandotte, Mich. |
| Tetronic 1501 | polyoxypropylene polyoxyethylene ethylene diamine | " " |

The results of the foregoing tests are principally of interest in showing the unobvious and unexpected nature of the present invention. The measurements of froth production, surface tension, and relative viscosity fail to indicate which of the drugs tested would be effective (or ineffective) for control of feedlot bloat. If inhibition of froth production is taken as an index, the most effective compounds would appear to be the trimethyl alkyl quaternaries with alkyl groups of 12 to 14 carbons (dodecyl,coco) but these drugs sharply reduce microbial activity, and would be expected to interfere with rumen fermentation. The dimethyl dialkyl quaternaries containing from 16 to 18 carbons in their alkyl groups (ditallow, disoya) are not as inhibiting to microbial activity, but give froth productions higher than the control. The data also fails to shed any light on the puzzling question of why poloxalene is the most effective known preventative for pasture bloat, while being relatively ineffective in controlling feedlot bloat.

RUMEN FLUID SAMPLING AND PREPARATION TECHNIQUES

Rumen fluid from cattle with rumen fistulas was obtained with a 150 ml syringe attached to a rubber tube extending through the cap of the rumen cannula. A metal strainer attached to the terminal end of the rubber tube was positioned near the middle of the ventral sac of the rumen, about 30 cm from the cannula. No further straining of the sample was necessary.

For the relative viscosity and surface tension tests, the rumen fluid sample was centrifuged at 500 RCF for 10 min. at room temperature to remove heavy feed particles, most protozoa and large bacteria. The supernatant was centrifuged at 1,9000 RCF for 20 min. at 5C to remove the bacteria. The supernatant from the high-speed centrifugation was considered to be a cell-free fraction.

RELATIVE VISCOSITY MEASUREMENTS

Viscosity of the cell-free rumen fluid and water was measured with an Ostwald viscometer in a 20° C water bath. Relative viscosity was defined as the ratio of the time of outflow of the cell-free rumen fluid to that of water. A volume of 5 ml was used for each measurement. Between samples the viscometer was rinsed with water and two 1 ml volumes of the next rumen fluid sample. The samples, maintained at 20° C before pipetting for analysis, were allowed to equilibrate at least 10 min. in the Ostwald viscometer in a 20° C water bath before rate of flow was measured.

SURFACE TENSION MEASUREMENTS

Surface tension was determined with a Du Nouy tensiometer according to methods outlined by Blake et al, *J. Animal Sci.* 16:190 (1957).

IN VITRO FROTH PRODUCTION

Rumen fluid was obtained from rumen fistulated cows about 6 hr. after they had consumed a feedlot ration. Fifty milliliters of rumen fluid was measured into a 100 ml graduated cylinder containing 1 g of finely ground feedlot ration. The ration was ground in a Christy-Norris mill with a 1 mm screen. The cylinder was placed in a 40 C incubator after its contents had been mixed by stirring. The volume of froth plus contents was read at 30, 45, 60, 75 and 90 min. after the start of incubation. The readings were averaged and compared. This method is similar to that used by Jacobson et al, *J. Animal Sci.* 16:515 (1957).

Froth production readings varied among rumen fluid samples of different animals and among samples collected from the same animal at different times after feeding and on different days. Therefore, for comparative purposes, a value relative to the actual readings was calculated. When the effect of various drugs on these readings were compared, the average reading of the untreated rumen fluid was given a value of one, and all other readings a value relative to the untreated sample. For every four treated samples, one untreated sample was measured.

MICROBIAL ACTIVITY MEASUREMENTS

The method used for the estimation of microbial activity was that of el-Shazly and Hungate, *Appl. Microbial.* 13:62 (1965). The rate of fermentation was measured by gas produced directly by fermentation and indirectly by the release of carbon dioxide from bicarbonate due to VFA production. For this work, the amount of gas produced was recorded at 5 min. intervals for 1 hour. The slopes of the linear regression line estimating the hourly rate of gas production were compared. Adjustment for variation between rumen fluid samples was made as outlined in in vitro froth production. For every five treated samples, one untreated sample was measured.

EXAMPLE II

Drugs were administered to rumen-fistulated cattle fed a concentrate ration consisting of 60 percent cracked sorghum grain, 22 percent dehydrated alfalfa pellets (17 percent crude protein, 0.53 cm diameter), 16 percent soybean meal, 1 percent salt and 1 percent dicalcium phosphate. The drugs were administered through the rumen fistula immediately before feeding. Treatments were administered only if froth produced after the previous feeding rose above the fistula. One to two hours after feeding, the effect of the drug on the change in froth volume and ruminal pressure was given a numerical value from 0 (no effect) to 5 (complete froth control) as set out in the following scale:

| Value | Description |
| --- | --- |
| 0 | Definite distention of left flank |
| 1 | Froth under pressure, but no apparent distention of left flank |
| 2 | Froth above cannula, but no abnormal pressure |
| 3 | Froth near level of fistula |
| 4 | Froth below fistula |
| 5 | No froth |

The result of this study are set out in Table B:

TABLE B

| Drug | Dose (g) | Effect[a] |
| --- | --- | --- |
| Poloxalene | 20 | 1.5 |
| Tetronic 1501 | 20 | 2.2 |
| Mineral oil | 20 | 0.8 |
| Pluradot HA 520 | 20 | 1.0 |
| Pluronic L81 | 20 | 1.8 |
| Dynafac P | 2 | 0.0 |
| Dynafac P | 100 | 0.5 |
| Arquad C-50 | 30 | 1.0 |
| Arquad T-50 | 30 | 2.0 |
| Arquad S-50 | 30 | 2.0 |
| Arquad 12-50 | 30 | 1.0 |
| Arquad 16-50 | 30 | 2.0 |
| Arquad 18-50 | 30 | 2.0 |
| Arquad 2C-75 | 15 | 3.4 |
| Arquad 2S-75 | 15 | 4.2 |
| Arquad 2HT-75 (same as Adogen 442)[b] | 15 | 4.2 |
| Adogen 442 | 10 | 4.0 |
| Adogen 442 | 5 | 3.4 |
| Pluradot HA 520 and Adogen 442 | 15 / 10 | 4.7 |
| Mineral oil and Adogen 442 | 30 / 15 | 4.7 |
| Tetronic 1501 and Adogen 442 | 15 / 15 | 4.9 |
| Tetronic 1501 and Adogen 442 | 10 / 5 | 4.0 |
| Tetronic 1501 and Adogen 442 | 10 / 10 | 4.3 |
| Tetronic 1501 and Adogen 442 | 7.5 / 7.5 | 4.3 |

[a] See evaluation scale previously described.
[b] Arquad is trade name of Armour & Co. and Adogen is trade name of Archer Daniels Midland Company.

Froth production was negligible when 10 and 15 of Adogen 442, Arquad 2HT-75 (both are dimethyl dihydrogenated tallow ammonium chloride) and Arquad 2S-75 were administered. A combination of 15 g. Adogen 442 and Tetronic 1501 completely collapsed the froth. Some froth was still present when smaller quantities of the combination were administered. A combination were administered. A combination of Adogen with light mineral oil and Pluradot HA 520 also enhanced the effect of the Adogen alone. Quaternary amines with three methyl groups (Arquad C-50, T-50, S-50, 12-50, 16-60, 18-50) were associated with a marked drop in feed intake of the cattle and diarrhea. No adverse effects were observed for any of the other treatments.

EXAMPLE III

During a 60 day pretrial period, 22 head of 2-4 year old cattle (weighing from 800 to 1,600 lbs.) were fed 20 lbs. concentrate (described in Example II) daily in two equal feedings. No hay was included in the ration. At the end of this period, the cattle were distributed among 5 lots. Three lots of 5 cattle each were balanced with respect to bloat scores. The fourth lot contained the remaining 7 cattle. The pretrial feeding regime was continued throughout the experiment. Three of the lots of 5 cattle were used to test the effect of 3 treatments on the severity of feedlot bloat in a 3 × 3 Latin square. The drug was mixed with the concentrate ration and fed for the last 2 days of each period. The drugs, dosages, and results are shown below in Table C. The fourth lot of cattle were used to test various drugs, but not in any special experimental design. These tests and results are summarized in Table D.

All lots were rated for severity of bloat 1.5 hours after the morning and afternoon feedings according to the following scale:

| Bloat Index | Description |
| --- | --- |
| 0 | No abnormal distension of left flank. |
| 1 | Slight distension of left flank, to a level near the hip bone. |
| 2 | Left flank rounded above the hip bone. |
| 3 | Left flank rounded above the hip bone and right side distended to a level near the hip bone. |
| 4 | Left and right flanks rounded above the hip bone, skin tight with drum-like tension. |
| 5 | Distress symptoms evident: frequent defecation and urination, muscular incoordination, protruding anus and labored breathing. |

TABLE C

| Period | Lot 1 Treatment, g/head/day | Lot 1 Bloat index, per head/day | Lot 2 Treatment, g/head/day | Lot 2 Bloat index, per head/day | Lot 3 Treatment, g/head/day | Lot 3 Bloat index, per head/day |
| --- | --- | --- | --- | --- | --- | --- |
| Pretrial (last 7 days). | None | 3.6 | None | 3.6 | None | 3.4 |
| 1A (5 days) | 15 g. Adogen[a] and 15 g. Tetronic.[b] | 0.8 | 15 g. Adogen | 1.6 | 15 g. Tetronic | 2.6 |
| 1A (2 days) | None | 3.8 | None | 3.3 | None | 4.2 |
| 2A (5 days) | 15 g. Tetronic | 4.6 | 15 g. Agoden and 15 g. Tetronic. | 1.8 | 15 g. Adogen | 0.8 |
| 2A (2 days) | None | 4.0 | None | 2.6 | None | 1.7 |
| 3A (5 days) | 15 g. Adogen | 1.3 | 15 g. Tetronic | 4.0 | 15 g. Adogen and 15 g. Tetronic. | 0.4 |

TABLE C—Continued

| Period | Lot 1 Treatment, g/head/day | Lot 1 Bloat index, per head/day | Lot 2 Treatment, g./head/day | Lot 2 Bloat index, per head/day | Lot 3 Treatment, g./head/day | Lot 3 Bloat index, per head/day |
|---|---|---|---|---|---|---|
| 3A (2 days) | None | 2.9 | None | 4.2 | None | 1.5 |
| 1B (5 days) | 5 g. Adogen | 2.6 | 10 g. mineral oil | 4.8 | 5 g. Adogen and 10 g. mineral oil | 1.4 |
| 1B (2 days) | None | 3.7 | None | 3.7 | None | 1.0 |
| 2B (5 days) | 3 g. Adogen and 10 g. mineral oil | 2.5 | 5 g. Adogen | 3.0 | 10 g. mineral oil | 2.1 |
| 2B (2 days) | None | 3.6 | None | 3.9 | None | 2.4 |
| 3B (5 days) | 10 g. mineral oil | 4.4 | 3 g. Adogen and 10 g. mineral oil | 2.8 | 5 g. Adogen | 1.6 |
| 3B (2 days) | None | 4.0 | None | 3.2 | None | 2.1 | a Adogen 442 is the trademark of Archer Daniels Midland Company for a 75% active paste of dimethyl dihydrogenated tallow ammonium chloride in aqueous isopropanol.

b Tetronic 1501 is a trademark of Wyandotte Chemicals. The Tetronics contain 4 polyoxypropylene polyoxyethylene block polymers added on to ethylene diamine.

TABLE D

Lot 4[a]

| Period | Treatment g/head/day | Bloat Index head/day |
|---|---|---|
| Pretrial | None | 1.7 |
| A (7 days) | 5g Adogen[b] | 1.1 |
| B (7 days) | 5 g Adogen | 1.1 |
| C (7 days) | 2.5g Adogen & 1.5g Poloxalene[d] | 1.5 |
| D (7 days) | 2.5g Adogen & 10g Mineral Oil | 1.2 |
| E (5 days) | 2.5g Adogen & 10g Mineral Oil | 1.0 |
| (2 days) | None | 0.9 |
| F (5 days) | 100g Dynafac P[c] | 1.9 |
| (2 days) | None | 1.5 |

[a] This lot contained 7 head of cattle. Except where noted differently, index was for a 7 day period.
[b] For Adogen see note (a) to Table B.
[c] Dynafac P is a Trademark of an Armour premix containing 20% trimethyl octadecyl, or a mixture of octadecyl and hexadecyl ammonium stearate in soybean feed. The recommended dose is 1.5 to 2.0g in Dynafac P/head/day to aid in the prevention of bloat.
[d] For Poloxalene see Example I.

The results given in Table C show that the combination treatment of Adogen and Tetronic decreases the severity of bloat to the greatest extent. Observations were extended for those cattle which showed mild bloat while being treated with the combination of drugs. In these cattle eructation did not occur with normal regularity. At the time of eructation, the cattle would completely deflate and no bloat would be evident. Thirty to 60 minutes later, mild bloat was again evident, but upon eructation, deflation would again occur. Therefore, it was apparent that the treatment was preventing froth formation in the rumen and that the remaining bloat was due to free gas. A 15 g/head/day dose of Adogen alone or a combination of 5 g Adogen and 10 g mineral oil were also effective in decreasing the severity of bloat, although not as reliably as the Adogen-Tetronic combination. A treatment carry-over was prevalent when Adogen was included in the treatment.

EXAMPLE IV

Specific preferred formulations for practicing the present invention with cattle include a top dressing and a cattle supplement which may be prepared as set out below:

Top Dressing

| Ingredient: | Weight percent: |
|---|---|
| Dimethyl dialkyl quaternary ammonium compound | 90 |
| Potassium chloride or sodium sulfate | 10 |

Cattle Supplement

| Ingredient: | Weight Percent: |
|---|---|
| Dimethyl dialkyl quaternary ammonium compound | 0.44 |
| Soybean meal | 30.00 |
| Wheat middlings | 30.00 |
| Corn gluten feed | 14.56 |
| Cottonseed meal | 10.00 |
| Urea | 5.0 |
| Molasses | 6.0 |
| Dicalcium phosphate | 2.0 |
| Trace mineral salt | 2.0 |
| Vitamin A (10,000 IU per lb. of supplement) | |

If the top dressing is to be stored for extended periods of time, especially at elevated temperatures, it is desired to include an antioxidant to inhibit the oxidation of dimethyl dialkyl quaternary ammonium compound. For example, the dimethyl dialkyl quaternary ammonium compound can contain 0.03% Ethoxyquin. Instead of potassium chloride or sodium sulfate other carriers can be used such as vermiculte, ground shelled corn, ground sorghum grain or wheat bran.

The top dressing in a granular from may be spread on top of rations thereof for animals fed in barns or from feed troughs.

The top dressing in granular form can be either mixed in or spread on top of the complete cattle ration at the rate of 8.8 lbs. of top dressing per 2,000 lbs. of feed. Thus each animal consuming 20 lbs. of feed will receive 40 g. of dimethyl dialkyl quaternary ammonium compound.

The cattle feeder can dilute the top dressing by adding ground grain. For example, one part of top dressing may be mixed with nine parts of ground shelled corn. One pound of this mixture added to 20 lbs. of complete ration (approximate consumption per head per day) will furnish 40 g. dimethyl dialkyl quaternary ammonium compound.

This cattle supplement is designed for the feeder who wishes to purchase his supplementary nutrients and drugs in one package from a commercial feed store and then mix the supplement on the farm with his homegrown grains. The quantity of supplement used may be 2.0 lbs. supplement per 20 lbs. total feed consumed. Each animal consuming 20 lbs. total feed daily will receive 40 g. dimethyl dialkyl quaternary ammonium compound.

EXAMPLE V

Formulations for practicing the present invention with sheep can be similar to those described for practicing the invention with cattle (see Example IV above). The recommended dose will be 8.8 lbs. of top dressing per 2,000 lbs. feed. Each sheep consuming 2 lbs. of feed per day will receive 4 g. of dimethyl dialkyl quaternary ammonium compound. The quantity of supplement used may be 0.2 lbs. supplement per 2.0 lbs. total feed consumed. Each animal consuming 2.0 lbs. total feed daily will receive 4 g. dimethyl dialkyl ammonium compound.

While the method and preparations of this invention are expected to have their greatest economic importance in controlling feedlot bloat in beef cattle, the method and preparations are also of value in controlling feedlot bloat in dairy cattle or sheep. In general, therefore, the term "ruminants" as used herein is intended to refer to beef cattle, dairy cattle, and sheep.

We claim

1. The method of controlling feedlot bloat in ruminants while the ruminants are being fed a high concentrate ration of the type which induces feedlot bloat, comprising orally administering to said ruminants a feedlot bloat-controlling effective amount of a ruminant-edible, water-soluble salt of a dimethyl dialkyl quaternary ammonium compound wherein said alkyl groups contain from 12 to 22 carbons.

2. The method of claim 1 in which alkyl groups contain predominantly from 16 to 18 carbons, and in which said water-soluble salt is selected from chloride, acetate, and sulfate salts.

3. The method of controlling bloat in beef cattle during feedlot fattening wherein said beef cattle are fed a high concentrate feedlot bloat-inducing ration for an extended period of time, comprising concurrently feeding to said beef cattle a feedlot bloat-controlling effective amount of a quaternary ammonium compound within the dosage range of from 0.5 to 4 grams thereof per 100 lbs. body weight per 24 hours., said quaternary compound being represented by the formula

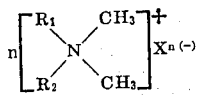

wherein $R_1$ and $R_2$ are aliphatic hydrocarbon groups containing from 12 to 22 carbons, X is an anion forming a ruminant-edible water-soluble salt with the quaternary cation, and $n$ is an integer from 1 to 2.

4. The method of claim 3 in which said beef cattle are fed from 1 to 3 grams of said quaternary ammonium compound per 100 lbs. body weight per 24 hrs.

5. The method of claim 4 in which said aliphatic hydrocarbon groups contain predominantly from 16 to 18 carbons.

6. The method of claim 4 in which 75 to 100 percent by weight of said aliphatic hydrocarbon groups are saturated alkyl groups containing from 16 to 18 carbons.

7. A preparation for controlling feedlot bloat in ruminants during feedlot feeding, comprising a ruminant feed in admixture with a ruminant feedlot bloat-controlling effective concentration of a quaternary compound represented by the formula

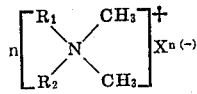

wherein $R_1$ and $R_2$ are aliphatic hydrocarbon groups containing from 12 to 22 carbons, X is an anion forming a ruminant-edible water-soluble salt with the quaternary cation, and $n$ is an integer from 1 2.

8. The preparation of claim 7 in which from 75–100 percent by weight of said aliphatic hydrocarbon groups are saturated alkyl groups containing from 16 to 18 carbons.

9. The preparation of claim 8 in which said anion is chloride.

10. The method of controlling feedlot bloat in dairy cattle, comprising orally administering to said dairy cattle a feedlot bloat-controlling effective amount of a quaternary compound within the dosage range of from .5 to 4 grams thereof per 100 lbs. body weight per 24 hours, said quaternary compound being represented by the formula

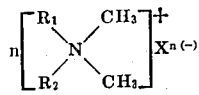

wherein $R_1$ and $R_2$ are aliphatic hydrocarbon groups containing from 12 to 22 carbons, X is an anion forming a ruminant-edible water-soluble salt with the quaternary cation, and $n$ is an integer from 1 to 2.

11. The method of controlling feedlot bloat in sheep, comprising orally administering to said sheep a feedlot bloat-controlling effective amount of a quarternary compound within the dosage range of from 0.5 to 4 grams thereof per 100 lbs. body weight per 24 hours, said quaternary compound being represented by the formula

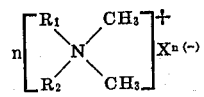

wherein $R_1$ and $R_2$ are aliphatic hydrocarbon groups con-taining from 12 to 22 carbons, X is an anion forming a ruminant-edible water-soluble salt with the quaternary cation, and $n$ is an integer from 1 to 2.

* * * * *